United States Patent
Snider et al.

(10) Patent No.: US 10,193,850 B2
(45) Date of Patent: Jan. 29, 2019

(54) DISCOVERING QUESTIONS, DIRECTIVES, AND REQUESTS FROM, AND PRIORITIZING REPLIES TO, A PREFERRED MESSAGE SENDER METHOD AND APPARATUS

(71) Applicant: Notion AI, Inc., Ann Arbor, MI (US)

(72) Inventors: Lindsay Snider, Ann Arbor, MI (US); Ian Berry, Ann Arbor, MI (US); Guy Suter, Ann Arbor, MI (US)

(73) Assignee: Notion AI, Inc., Ann Arbor, MI (US)

( * ) Notice: Subject to any disclaimer, the term of this patent is extended or adjusted under 35 U.S.C. 154(b) by 176 days.

(21) Appl. No.: 15/085,480

(22) Filed: Mar. 30, 2016

(65) Prior Publication Data
US 2017/0289093 A1    Oct. 5, 2017

(51) Int. Cl.
*G06F 15/16*    (2006.01)
*H04L 12/58*    (2006.01)

(52) U.S. Cl.
CPC .............. *H04L 51/34* (2013.01); *H04L 51/18* (2013.01); *H04L 51/063* (2013.01); *H04L 51/16* (2013.01)

(58) Field of Classification Search
CPC ..... H04L 51/34; H04L 12/18; H04L 12/1813; H04L 12/1818; H04L 12/58; H04L 12/588; H04L 29/06414; H04L 29/06027
See application file for complete search history.

(56) References Cited

U.S. PATENT DOCUMENTS

| | | | |
|---|---|---|---|
| 9,306,899 B1* | 4/2016 | Vendrow ................. | H04L 51/34 |
| 9,554,356 B2* | 1/2017 | Dotan-Cohen ... | H04M 3/42365 |
| 9,825,896 B2* | 11/2017 | Snider ..................... | H04L 51/26 |
| 9,887,947 B2* | 2/2018 | Snider ..................... | H04L 51/18 |
| 10,063,497 B2* | 8/2018 | Snider ..................... | H04L 51/02 |
| 2013/0194301 A1* | 8/2013 | Robbins .................. | G06F 21/60 345/629 |
| 2014/0085076 A1* | 3/2014 | Carnes ................. | A61B 5/0022 340/502 |
| 2016/0155063 A1* | 6/2016 | Rich ..................... | G06N 99/005 706/12 |
| 2016/0253778 A1* | 9/2016 | Ballard ..................... | G06T 3/40 345/428 |

(Continued)

*Primary Examiner* — Dhairya A Patel
(74) *Attorney, Agent, or Firm* — Jeffrey Schox; Padowithz Alce

(57) ABSTRACT

When a message contains an actionable request or question the invention measures a time til transmitted reply (TTTR). Replies which contain substantive answers such as dates, decisions, quantities, concurrence, or content are paired with their respective request for each sender-recipient directed dyad. The replies are categorized to the type of action taken in response to the request. The history of each dyad is examined to determine the relative importance each party ascribes to the other and a range of typical TTTR is stored. Questions, directives, and requests are discovered in a message by scanning for deadline words, calendar words, time words, urgency phrases, question words such as who what when, capability syntax, and agreement/disagreement alternatives. A user receives an alert when a response is nearly past a deadline or close to exceeding expected time to reply, immediately upon receipt, or both. An alert offers a potential response.

19 Claims, 9 Drawing Sheets

(56) References Cited

U.S. PATENT DOCUMENTS

| | | | | |
|---|---|---|---|---|
| 2016/0255032 A1* | 9/2016 | Vendrow | ............... | G06T 3/40 |
| | | | | 709/206 |
| 2016/0359771 A1* | 12/2016 | Sridhar | ............... | H04L 51/02 |
| 2017/0372253 A1* | 12/2017 | Nandi | ............ | G06Q 10/063112 |

* cited by examiner

DISCOVERING QUESTIONS, DIRECTIVES, AND REQUESTS FROM, AND PRIORITIZING REPLIES TO, A PREFERRED MESSAGE SENDER METHOD AND APPARATUS

CROSS-REFERENCE TO RELATED APPLICATIONS

None

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of the Invention

The disclosure relates to electronic message systems and transformation of a question, directive, or request into priority and content of a reply.

Background of the Related Technologies

Presently, email traffic is growing without bounds from both automated senders and individuals. Recipients are frustrated that each day includes many hours searching through their inbox for desired correspondence. As is known, RFC's 822, 2822, and 4021 describe use of headers for email such as "IN-REPLY-TO." Other less mature messaging systems are anticipated to converge toward similar standards for meta data.

One problem is that an abundance of low priority messages bury an action or question that a recipient would wish to prioritize.

What is needed is a method of discovering message requests which have been overlooked and smoothly returning them into scope or formulating suitably responsive replies.

What is needed is a more efficient way to answer an important request for information or action received from a preferred sender and eliminate undesired delay due to the ever-rising deluge of touches from lower affiliation message senders.

BRIEF SUMMARY OF THE INVENTION

An apparatus and method determines when a message contains an actionable question, directive, or request. It measures time til transmitted reply (TTTR) for recent exchanges with each sender in order to predict an estimated time to reply. Interrogative words and phrases found within the message are scored. Text strings are matched with frequently asked questions. Deadline syntax and calendar and time words are detected. Polite questions from upper hierarchy senders are correctly recognized as commands and requests for action or agreement.

In addition to message headers such as subject, reference, message-id, and in-reply-to, content analysis can determine which outbound messages are in reply to received messages. Agreement and disagreement vocabulary is identified. Replies which contain substantive answers such as dates, decisions, quantities, concurrence, or content are paired with their respective request for each sender-recipient directed dyad. A reply-to message is considered responsive when it reiterates some of the language of the question and provides a commitment, decision, or value.

The replies are categorized to the type of action taken in response to the request. A selection among choices, a numerical value, a noun or verb, a schedule, completion of a task, acceptance of a responsibility, or a Proper name are examples of the categories of response.

Questions are discovered in a message body by scanning for deadline words, calendar words, time words, urgency phrases, question words such as who what when, capability syntax, and agreement/disagreement alternatives. Rhetorical or pro forma questions and exhortations may be filtered out, e.g. "click here . . . to view in a browser, to unsubscribe, to rate your experience, did you hug your kids, vote early and often . . . ."

The history of each sender-recipient directed dyad is examined to determine the relative importance each ascribes to the other and a range of typical TTTR is stored. The relative importance of each sender to the recipient is determined by frequency and responsiveness of the recipient to actionable requests. Lackadaisical responses lower the priority of a future reply. Some relationships may trigger an alert upon first receipt of a message.

Generally, a user receives an alert when a response is nearly past a deadline or outside the normal range of estimated time to reply for a preferred relationship. The type and persistence of an alert reflects the nature of the request and the importance of the sender. A message and the history of messages between sender and receiver are transformed into a level of interruption and detail. A series of alerts may be scheduled from immediate upon receipt, to approaching a deadline, and at standard deviations from an expected time to reply according to the user selection and the history of the sender-recipient relationship.

The alert may contain a draft of a response in the proper voice, content, and style appropriate to the relationship of the sender-recipient directed dyad. The alert may trigger a requested process or an external application.

Alerting is embodied by one of push notification, badge counts, putting something to the top of your inbox, a phone call, 3rd party communication channel such as a tweet, an in person notification, and activating a tactile actuator.

BRIEF DESCRIPTION OF THE SEVERAL VIEWS OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF THE INVENTION

Figure 1:
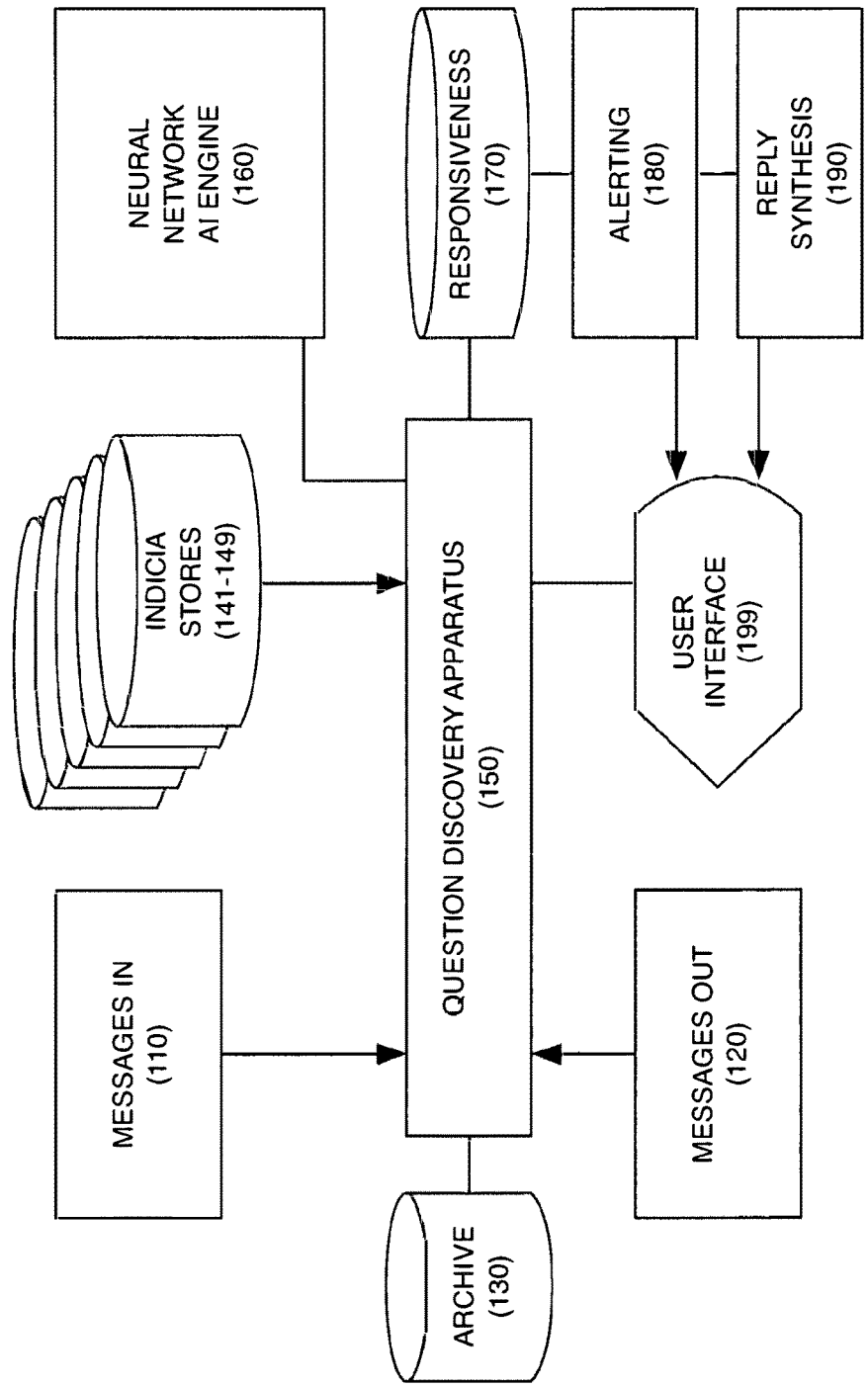
FIG. 1 is a block diagram of a system embodiment.

An apparatus and method determines when a message body contains an actionable question and measures a time til transmitted reply (TTTR). Interrogative words and phrases found within the message are scored. Text strings are matched with frequently asked questions. Deadline syntax and calendar and time words are detected. Agreement and disagreement vocabulary is identified.

Replies which contain substantive answers such as dates, decisions, quantities, concurrence, or content are paired with their respective request for each sender-recipient directed dyad. A reply-to is considered responsive when it reiterates some of the language of the question and provides a commitment, decision, or value.

The replies are categorized to the type of action taken in response to the request. A selection among choices, a numerical value, a noun or verb, a schedule, completion of a task, acceptance of a responsibility, or a member of a list of place names and proper names are examples of the categories of response.

Questions and directives are discovered in a message body by scanning for deadline words, calendar words, time words, urgency phrases, question words such as who, what, when, where, how, how many, how much, why, capability syntax, and agreement/disagreement alternatives.

Imperative phrases or supplicative phrases are parsed as commands or requests for information or for action which demand a reply or acknowledgement.

The history of each sender-recipient directed dyad is examined to determine the relative importance each ascribes to the other and a range of typical TTTR is stored. The relative importance of each sender to the recipient is determined by frequency and responsiveness of the recipient to actionable requests. Each lackadaisical response lowers the priority of a reply by influencing a trend line. Other metrics of sender-recipient importance are derived from social media connections, membership in communities, correspondence and interaction within messaging services, and quality of interaction.

Each question may have importance either from the sender relationship or the content of the message. Important questions are presented to the user based on relationships, message content, and previous user behavior. Both inbound and outbound questions are tracked to warn either or both parties of error by omission. Examples of alert content include: " . . . there is a question from [someone important to you who you would have responded to by now] . . . it sounds important, maybe you should take a look." Or "you sent a question to [a frequent responder] and it has not yet been attended to . . . maybe you should followup . . . ".

A user receives an alert when a response is nearly past a deadline or outside the range of typical TTTR for a preferred relationship. The type and persistence of an alert reflects the nature of the request and the importance of the sender. A message and the history of messages between sender and receiver are transformed into a level of interruption and detail for an unrequited message. A highly interactive message history or active selection can trigger an alert upon message receipt as well as anticipating trending estimates of time to reply.

The alert may contain a draft of a response in the proper voice, content, and style appropriate to the relationship of the sender-recipient directed dyad. The alert may trigger a requested process or an external application.

An apparatus comprises a store of frequently asked questions; a store of interrogatory words and phrases; a store of deadline vocabulary and phrases; a store of sentiment expressive words and phrases; a store of imperative and supplicative words and phrases; a store of units of measure and counting words; a store of affirmation and negation words and phrases; a store of subjunctive mood verbs; and a circuit to determine when a question, directive, or action request is in a message by matching text strings extracted from received messages with contents of the stores.

A neural network or similar AI engine is trained to track which sentences will evaluate as questions which elicit reply messages. Even without localized language vocabulary stores, the pattern of messages and replies in message history can reveal Unicode strings which typically result in rapid reply through a learning/training process. Native speakers can then resolve these correlations as causal or artifacts. Similarly, rhetorical and pro forma question syntax may be filtered out by training and by regular expression matching.

Messages containing requests which are uncharacteristically left unpaired with serious responses given a sender-recipient message relationship are scheduled for automatic bumping back into scope.

An automatic reminder may be composed and offered to the requestor to support reiteration of an information or action request which seems neglected.

Reflecting the typical response time that a sender-recipient pair has demonstrated over recent history, any long lapse triggers a re-escalation of the unrequited message to the front of a queue or top of a stack.

Or flags and colors may be set on messages which have not received a suitable response within the standard deviation of typical times of interactivity for the sender-recipient relationship.

The user may close the incident or continue the situation as requiring a resolution.

A system helps both message senders and message recipients track whether questions have been answered or requests for action have been acknowledged. It does not require that sender or recipient use the same message system and may be active for only one and not the other.

By parsing the message headers and content retrieved from a message server, the system can distinguish an initial question or request posed by a first party from a reply message to that first party. A timer initialized by one and ended by the other reveals the unrequited messages which contain a request for action or a query but have not obtained a reply.

The initial value of each timer may be standardized or customized.

By parsing the message content for target dates, time references, or calendar notation, the timer may be automatically set to reflect the timeframe within which the reply is needed. The message history of each sender-recipient pair may be transformed into an expected-time-to-reply which may be asymmetrical based on the relationship. And the user may intervene to adjust expectations to meet workload or increased personal sensitivity to a sender or group.

A stream of messages is transformed by removing messages that do not pose a request or question and removing messages which have obtained a responsive reply along with the relevant reply. The remaining messages which are still within the limit set by the timer are presented as a short précis of the query or request in a display organized as the user requires. The actual time-to-reply is annotated back into the sender-recipient history store.

Referring now to the figures, in one embodiment, a system 100 includes an apparatus 150 coupled to a message inbox 110 and a message outbox 120 and other message archives 130. The apparatus has a plurality of indicia stores 141-149 which contain indicia of interrogatory words and phrases 141, imperative/supplicatory words and phrases 142, deadline/calendar words and phrases 143, frequently asked questions 144, verb forms in subjunctive mood 145, sentiment expressive (urgency/anxiety/anger) words and phrases 146, negatory question forms 147, patterns 148, and affirmation/negation words and phrases 149. The apparatus is coupled to a neural net and AI engine 160 which learns from or is trained by message histories. The apparatus is coupled to a store of responsiveness/importance measures for each sender-recipient directed dyad 170. The apparatus is coupled to an alerting system 180 and to a message reply synthesis/proposal system 190 and to a user interface 199. Indicia include strings, hashes, meta data, tags, parsing rules, and linguistic patterns.

Figure 7:
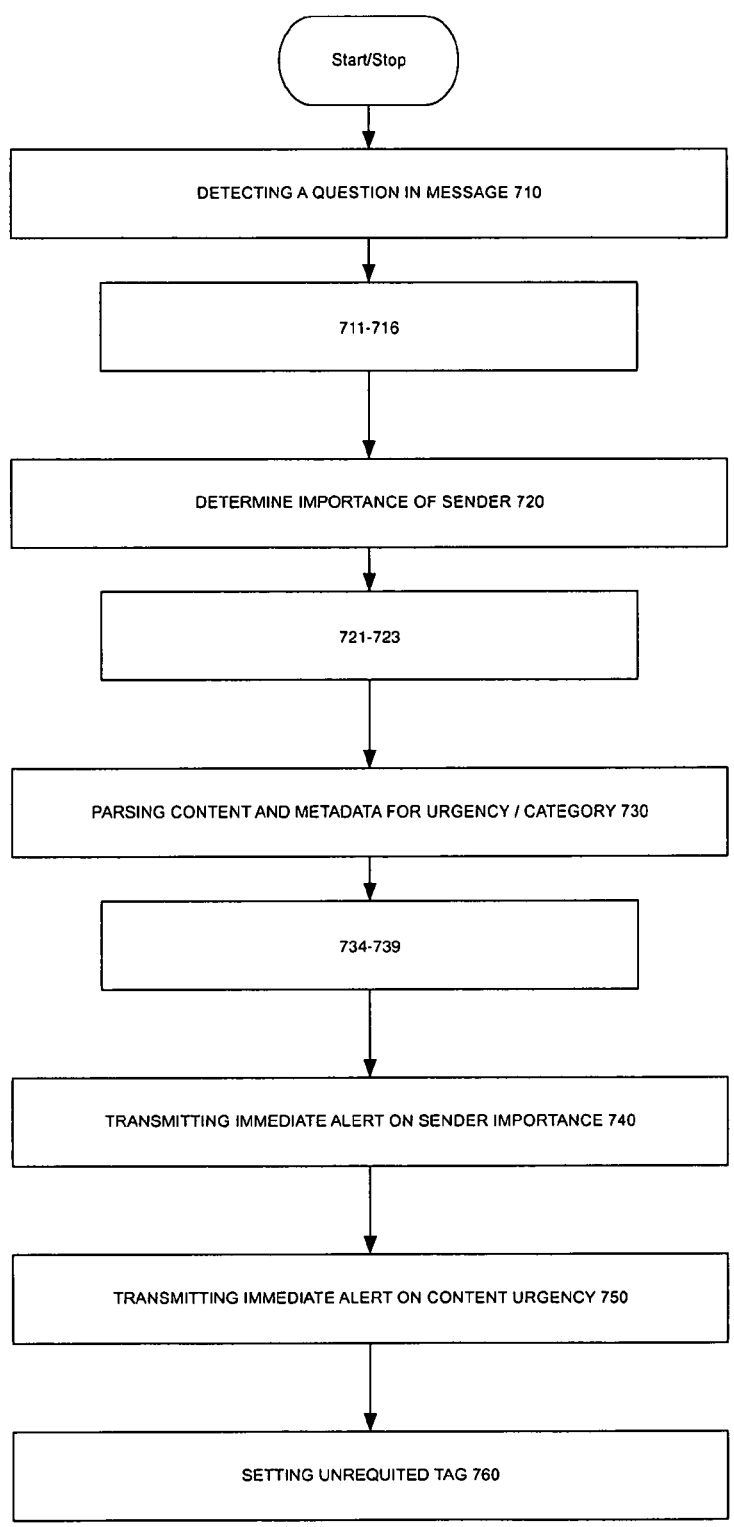
FIGS. 7-9 are flowcharts of method embodiments performed by a processor executing instructions from a non-transitory store.
Figure 8:
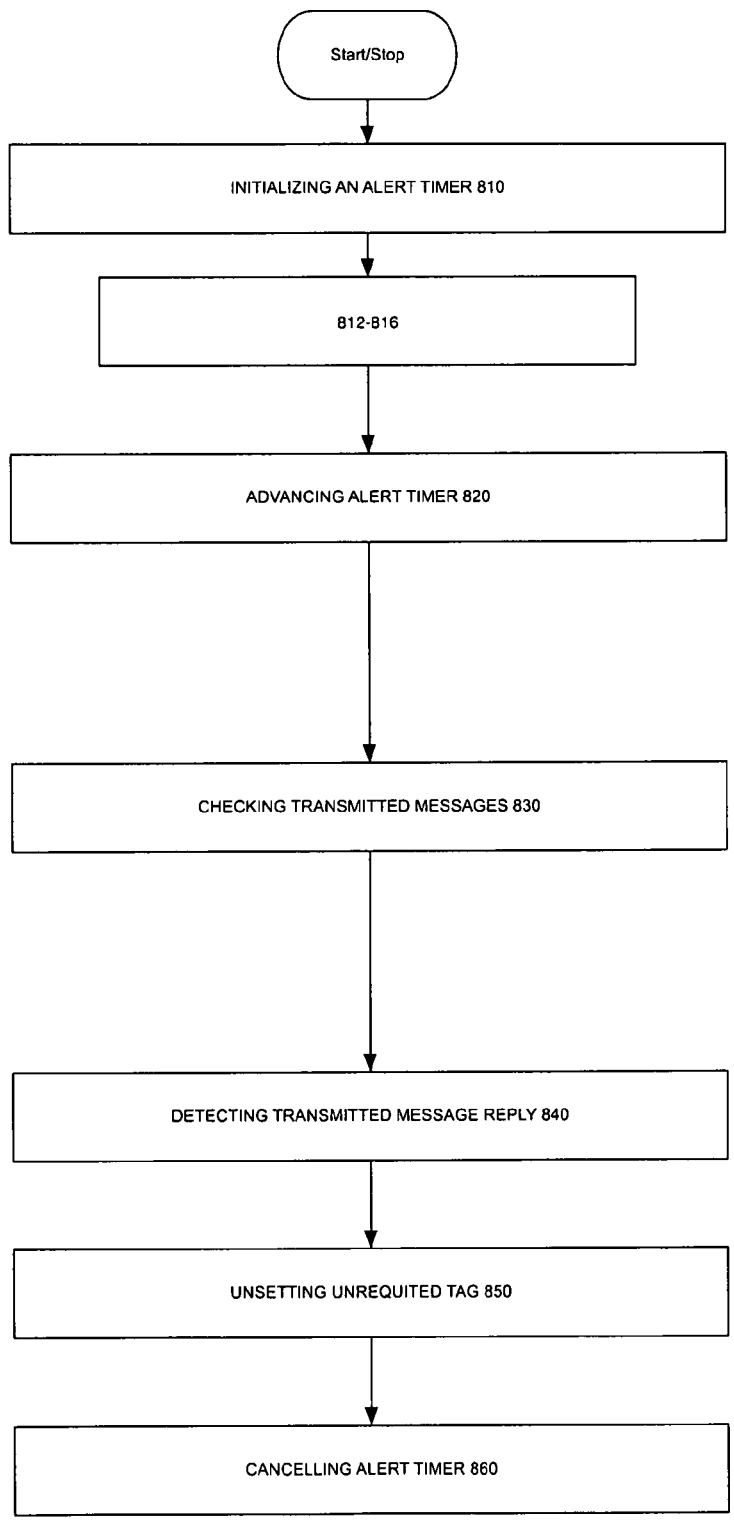
Figure 9:
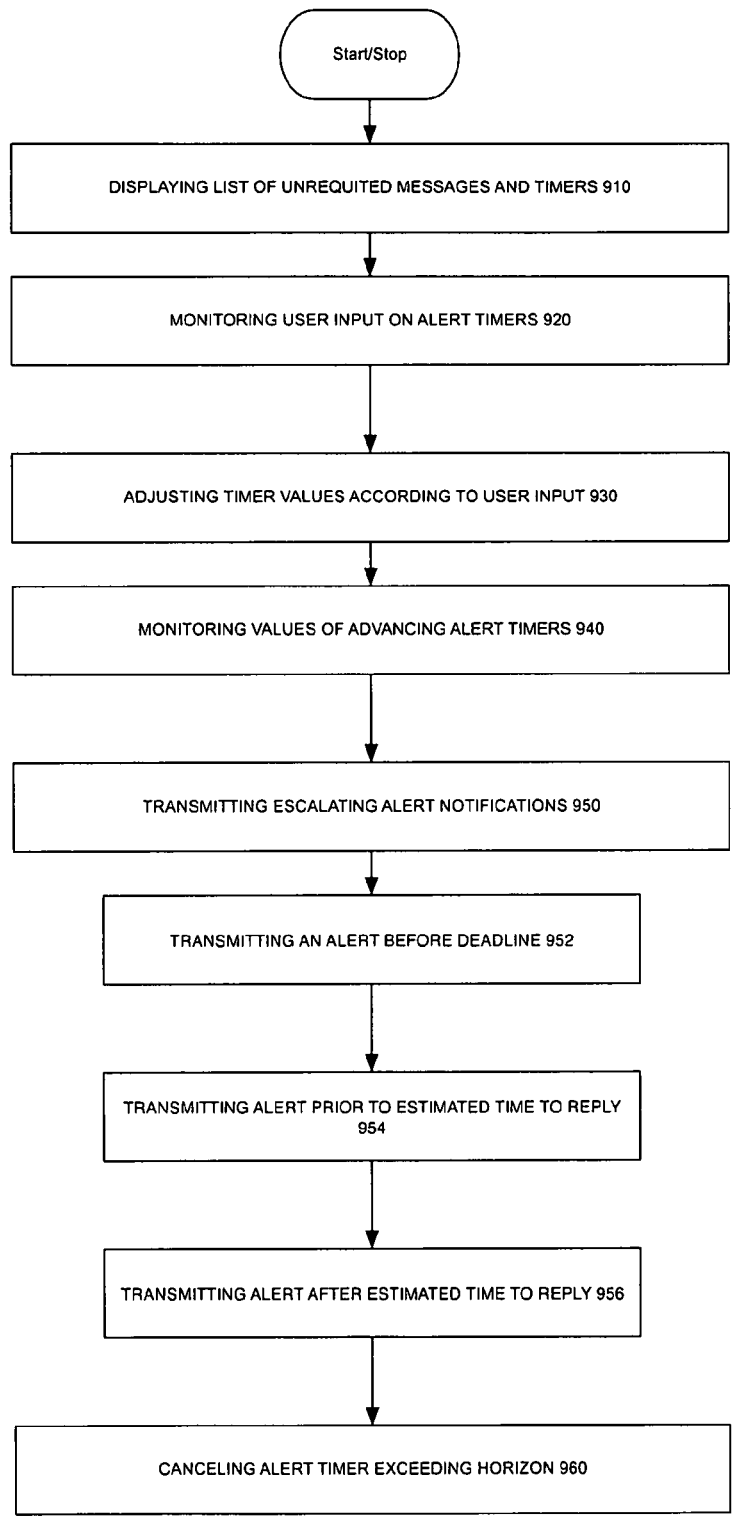

Referring now to the flowcharts of method embodiments, FIG. 7 illustrates a method 700 for notification that a received message from a preferred sender demands a timely response, the method includes: detecting 710 a condition that a received message contains at least one of a group, a question, a direction, and an action request; determining 720 a relative importance of message sender to the recipient; parsing message content and metadata 730 for urgency and potential category of response; transmitting an immediate alert 740 to message recipient when relative importance of message sender exceeds a sender importance threshold; transmitting an immediate alert 750 to message recipient when content urgency exceeds a subject urgency threshold; and setting an unrequited tag 760 on said received message.

In an embodiment, detecting a condition that a received message contains at least one of a group, a question, a direction, and an action request includes operating a neural network engine 711 on messages sent and received; operating an artificial intelligence engine 712 on message pairs of requests and replies; parsing headers and content for interrogatory words and phrases 713; parsing headers and content for deadline words and phrases 714; parsing headers and content for imperative and supplicative words and phrases 715; and parsing headers and content for questions similar to frequently asked questions in a stored knowledge-base 716.

In an embodiment, determining a relative importance of message sender to the recipient comprises: measuring longevity and recency 721; measuring quantity and frequency 722; and measuring quality and symmetry 723.

In an embodiment, parsing message content and metadata for urgency of response includes at least one of: scanning content for sentiment words and phrases 734; scanning content for deadline words and phrases 735; and scanning content for imperative words and phrases 736.

In an embodiment, parsing message content and metadata for potential category of response includes at least one of: scanning content for decision affirmation or negation words and phrases 737; scanning content for calendar words and phrases 738; and scanning content for units of measure and counting words 739.

The method also includes a process 800 including initializing an alert timer to a value 810; while said alert timer is advancing 820, checking transmitted messages 830 for substantially responding to received message; upon detecting a transmitted message which substantially responds to received message 840, unsetting said unrequited tag 850 and cancelling said alert timer 860. In an embodiment, initializing an alert timer to a value includes setting a value 812 equal to a deadline found in the message; setting a value 814 equal to an estimated time to transmitted reply; and setting a value 816 corresponding to typical time between messages exchanged between sender and recipient.

The method also includes process 900: displaying a list 910 of unrequited messages and values of advancing alert timers; monitoring user input 920 to modify or cancel advancing alert timers; adjusting alert timer values 930 according to user input; monitoring the values of advancing alert timers 940; transmitting escalating alert notifications 950 upon exceeding alert timer thresholds; and canceling an alert timer 960 upon exceeding a timer horizon threshold.

In an embodiment, transmitting escalating alert notifications upon exceeding alert timer thresholds includes at least one of: transmitting an alert 952 a first warning period before a deadline found in the message; transmitting an alert 954 at a second warning period prior to exceeding the estimated time to reply to this sender; and transmitting an alert 956 after exceeding an estimated time to reply by a standard deviation.

Figure 2:
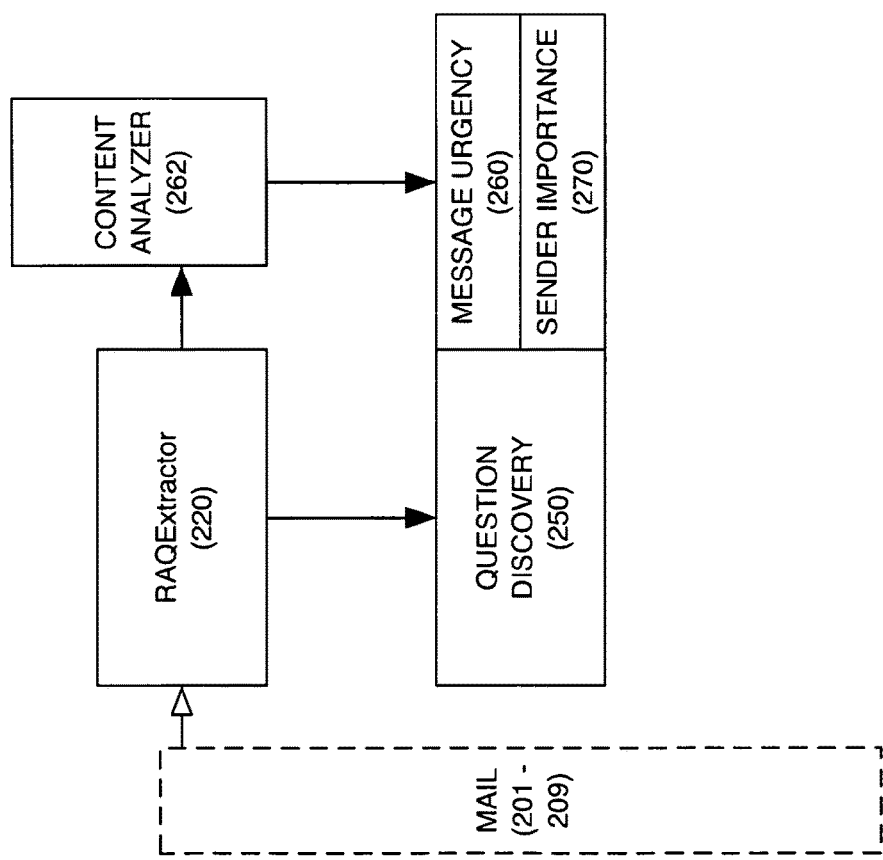
FIG. 2-5 illustrate apparatus embodiments of the invention.

Referring now to FIG. 2, a first apparatus embodiment 200 includes: a message request action/query extractor (RAQE) circuit 220; a Question Discovery circuit 250, a Message Urgency circuit 260, a Content Analyzer circuit 262; and a Sender Importance circuit 270, wherein the RAQE is communicatively coupled to an externally provided electronic message server in an example any one or more of a plurality of external electronic mail services 201-209. Advantageously, the invention does not require installation at a service or the user to transition her messaging services solely to the invention. Each message is received by the Requested Action or Query Extractor 220 which presents the headers and content to a content analyzer 262 to determine its urgency and category. The message is also provided to a Question Discovery circuit 250 to determine what directive, question, or action is (are) requested. The previous message history of Sender's relationship with the Recipient is used by the Sender Importance circuit 270. The Message Urgency circuit 260 determines a priority of the currently received message.

Figure 3:
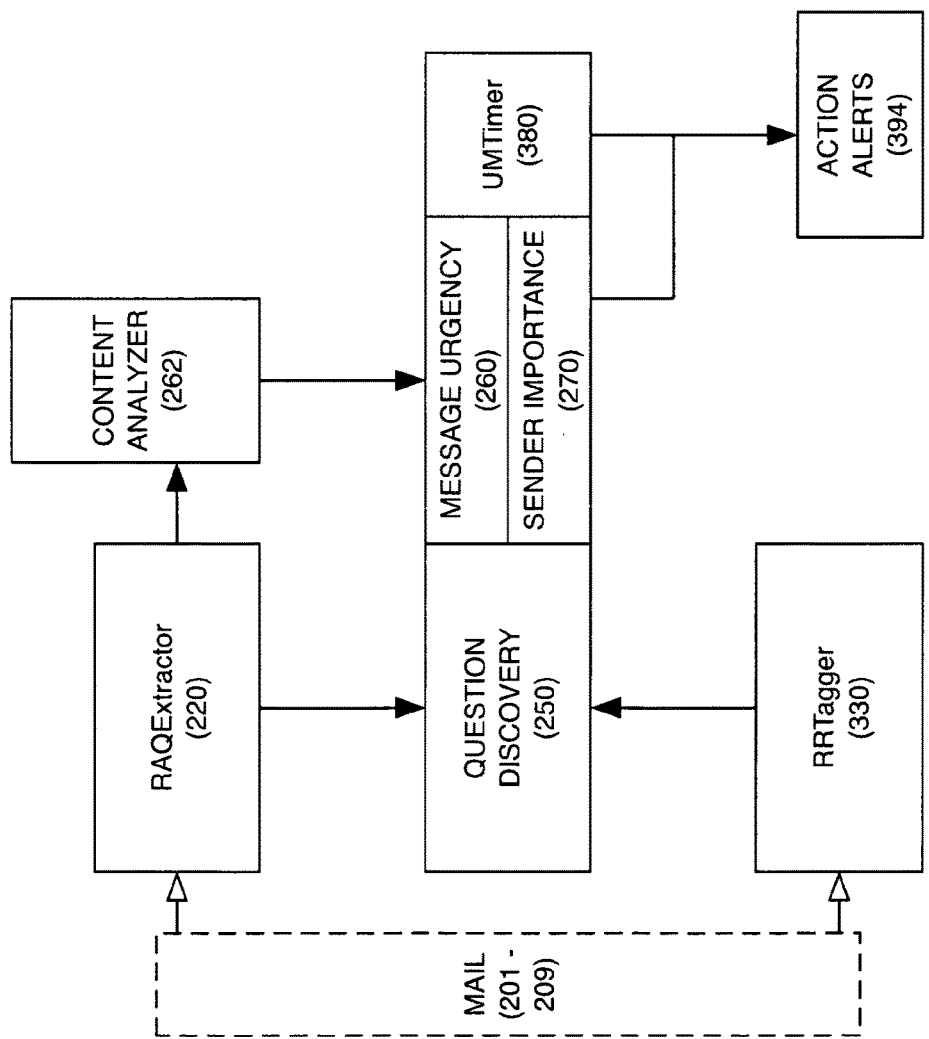

In the embodiment shown in FIG. 3, the apparatus also includes: an Action Alerts circuit 394 which may be directly triggered by an urgent message or by a message from an important sender; an Unrequited Message Timer 380 which is initiated by a combination of the message urgency e.g. a deadline, or by the sender's importance relative to other senders; and a Responsive Reply Tagger 330 which upon determining a substantially responsive outbound message cancels the timer to prevent further alerts. Advantageously, the apparatus also determines when an outbound request has not been responded to in a timely manner and alerts the user to transmit a followup or retransmit the request.

Figure 4:
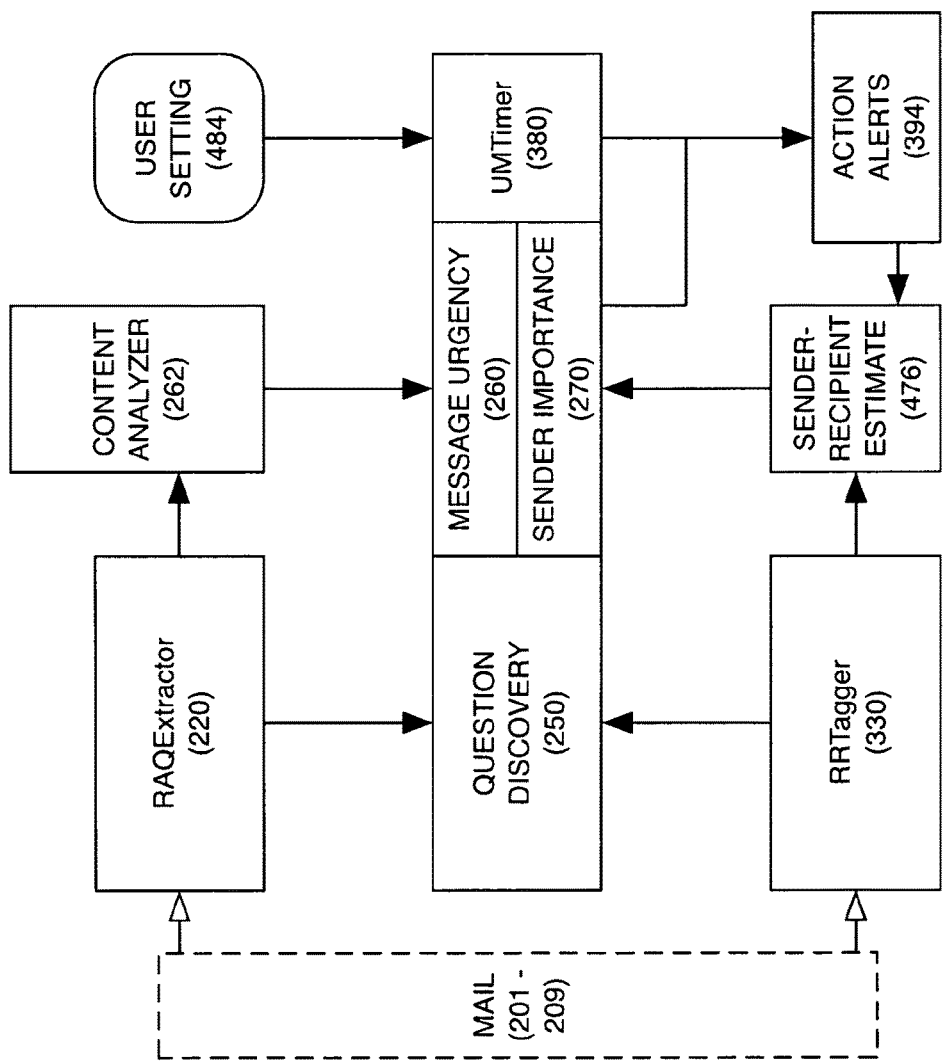

In an embodiment illustrated in FIG. 4, the apparatus also has: a Sender-recipient Estimate circuit 476 which integrates the history of the messages exchanged between each directed dyad, the responsiveness of each party, and forecasts an expected time til transmitted reply which is combined to provide a relative importance of each sender to the recipient. The apparatus also has a User Setting interface 484 which enables the user to override the timer or change the relative importance of any sender. Advantageously, the apparatus self-adjusts according to the actual behavior of the sender and the recipient without requiring user intervention. Other optional user settings may determine a series of alerts and when they are triggered relative to a deadline or to the estimated time to transmitted reply.

Figure 5:
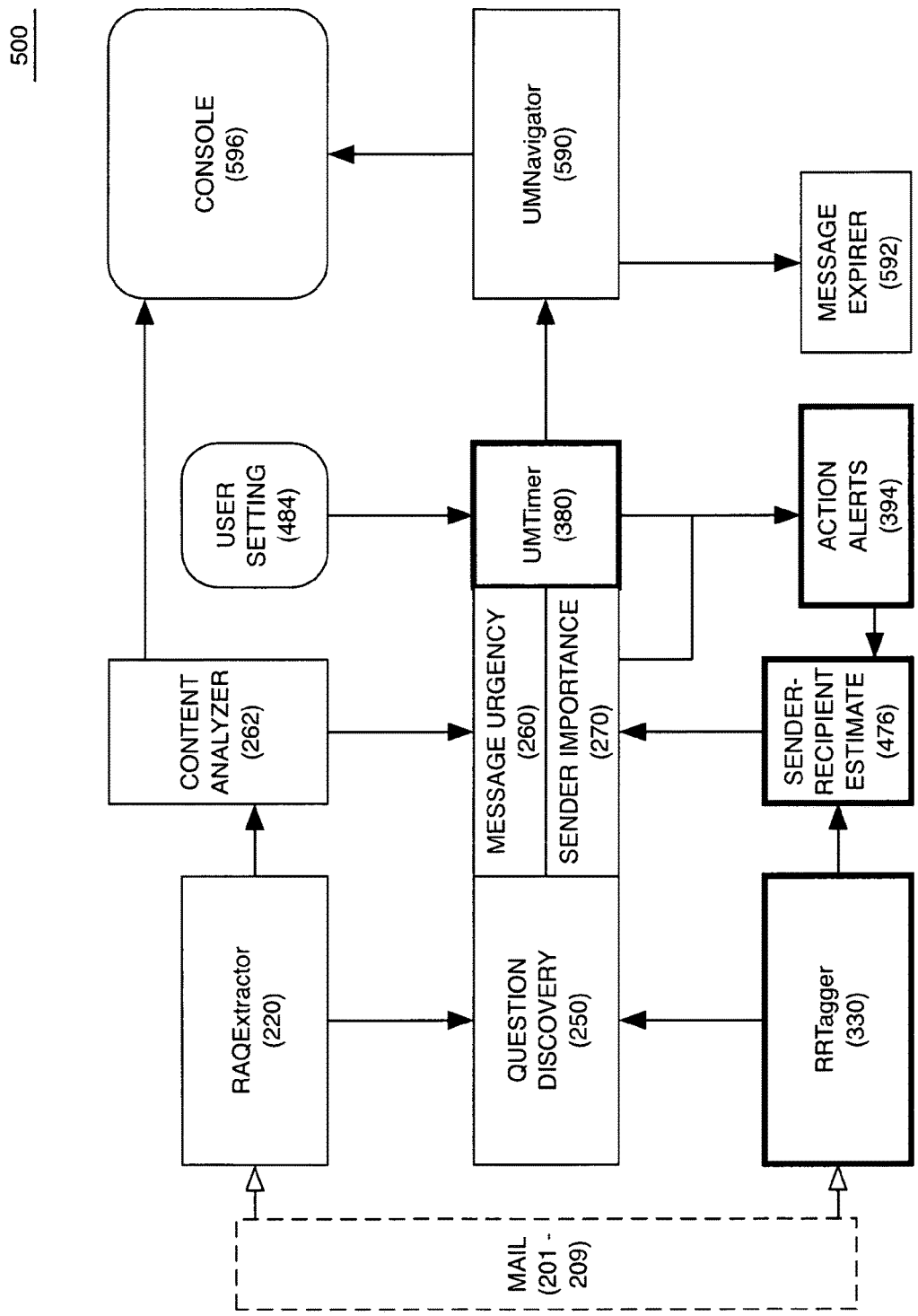

Referring to the embodiment of FIG. 5, the apparatus 500 also includes an Unrequited Message Navigator 590 which manages all the timers in operation and enables the user to select by category, by sender importance, or by deadline schedule for display or for modification. Messages which have long passed utility are removed by the Message Expirer circuit 592 at a default threshold. The apparatus also includes a Console 596 for the user to review the content of any message and the outstanding unrequited messages being tracked by the Navigator 590. The Console allows the user to review all messages organized by sender importance or all messages in a category of urgency or type of request. The apparatus is easily distinguished from conventional message systems by its timers 380 for each message containing a requested action or query which is set by a message content 262 or by an estimate for time to reply based on recent relationship history 476 of the sender-recipient, and means for triggering alerts 394 in the absence of termination means 330 by a responsive reply to the request or query.

Another aspect of the invention is a method for operation of a system to transform bidirectional streams of electronic messages in a plurality of electronic message systems into selectable actions so that requests for action or queries for answers are not lost or their replies unintentionally delayed.

Another aspect of the invention is a method for operation of an apparatus by performance by a processor of instructions stored in non-transitory medium includes: retrieving from at least one message server a plurality of reply messages including "IN-REPLY-TO" headers; retrieving from at least one message server a plurality of messages containing a request for action or a query (RAQ); initiating a timer for each message transmitted by the server from a first party to a second party which contains a RAQ; ending the timer for each message received by a first party from a second party which contains an "IN-REPLY-TO" indication in a message header. In embodiments, the timer is ended on the condition when the subject headers match. In embodiments, the timer is ended on the condition when a textual analysis of the message body determines that the content is a responsive reply to a RAQ. Non-responsive body text includes as examples "it depends, we'll see, I'll think about it, to be determined (TBD), vacation out-of-office, or I do not recall." In an embodiment all timers are set to a standard value such as 30 days. Various dispositions or processes are invoked by the apparatus on the condition that the timer is not ended by a reply prior to the expiration of the standard value. In an embodiment, the unrequited message is deleted. Timers track RAQ messages transmitted from and received by each user using any identity in any message service.

In another embodiment, the method further includes one or more ways to set the timers to a variety of values rather than a single default value. The method of operation includes setting a timer according to a value determined by analyzing the content of the message such as a target date, a quantity of time from the message transmission, a day of the week, a calendar period, or government or personal milestone.

The method includes setting a timer based on the relationship history between a sender and a recipient. In a hierarchical organization, the expected time to reply will be asymmetrical between top down RAQ than for bottom up RAQ. More distant history will be over ridden by recent history which is retained by the apparatus. In an embodiment, a user may directly intervene by setting or resetting the timer to match the difficulty or conflicting priorities of a number of requested actions. The user may also determine the disposition or event triggered upon expiration of each timer.

In another embodiment, the method of operation of the apparatus further transforms a bidirectional stream of messages into proposed or default actions or selectable displays. In embodiments, the method further includes extracting a précis in a few lines of text of the requested action or query from the content of the message for display in a console. In an embodiment, the method includes activating an alert to cause a message such as an auditory or visual notification that timer for a message is within a range of expiration without obtaining a responsive reply. In embodiments the range is one of a positive value or a negative value. In an embodiment, the method causes the unrequited message to expire, removing it from the messages whose replies are tracked. In an embodiment, the expiration is annotated to a relationship history which will influence the estimated time to reply for future messages between the sender and the recipient. In an embodiment, the apparatus receives control commands from a graphical user interface device and organizes message for display within the console according to recency, urgency, relationship importance, last in, first in, type of request or query, and types of proposed or default dispositions upon expiration of a timer.

The disclosure provides the following non-limiting enablements to illustrate embodiments of the invention.

One aspect of the invention is a method for determining an actionable request within a message which includes: searching for a member of a list of interrogative words and phrases (how many, how much, where, who, when, what, combien, quo, quoi, can you); searching for a member of a list of deadline words and phrases (by Friday, by close of business, third quarter, 24 hours, this month, right away); searching for a member of a list of imperative/supplicative words and phrases (tell me, pick one, please, rsvp, send, call me, asap); and, searching for verbs in a subjunctive mood.

In an embodiment the method also includes tracking messages exchanged between sender-recipient directed dyad. In an embodiment, the method can determine that a first message has a optional action request by parsing phrases which negate a question (e.g. trouble/problem viewing this email). In an embodiment, the method can determine that a first message and a second message are linked by applying neural network or similar AI to track which sentences will get questions or answers.

In an embodiment, tracking includes reading a history of messages received and message transmitted; eliminating informational, exhortative, and rhetorical messages from consideration; comparing timestamps of a message received which contains a question and a reply containing a substantive answer to the question; and, tagging a message as unrequited on the condition that no substantive reply has been transmitted within TTTR of message receipt.

In an embodiment, the method also includes ranking unrequited messages for further prosecution. In embodiments, ranking can be done by one or more of the following: ordering messages which contain a deadline from closest to farthest; ordering messages from senders according to highest probability of reply to lowest probability of reply; ordering messages according to shortest TTTR; and, ordering messages according to most number of anxiety or urgency sentiment words embedded.

The method also includes alerting when a message is uncharacteristically unrequited. Alerting can include one or more of the following: determining when a message from sender has a higher than average probability of response to deadline by recipient; determining recipient's range of TTTR for sender requests; setting a timer when a message is received according to deadline and TTTR; and, reiterating the message to the recipient upon expiration of the timer.

In an embodiment, the method also includes synthesizing a response in proper voice, style, and content for replying to a query.

Synthesizing a response can include one or more of the following: extracting and reusing query text from a received message body; proposing agreement or negation as most recently expressed; presenting an editable form for data entry; presenting a drag and drop user interface for files; and, initiating an application to fulfill a request.

Synthesizing a response includes reusing answer text extracted from previously sent message bodies.

The nature of the question presented and the history between the sender and recipient can affect the method for prioritizing a reply in one or more of the following ways: determining a percentage of messages between a sender and a recipient which are replies to a prior message within a recent period of time; determining a percentage of messages between a sender and a recipient which contain questions, deadlines, requests, or action plans; and determining a probability of response and mean time between receiving a message and transmitting a reply message responsive to questions, deadlines, requests, or actions.

Another aspect of the invention is a method to determine that a question within a message has not been attended within a normal period by performing the steps: for each sender—recipient pair setting at least one timer when the probability of response exceeds a tracking threshold; setting each timer to the mean time between request reception and reply transmittal; starting each timer when a message which contains a request, deadline, command, or question is received; ending each timer when a reply is transmitted substantially resolving the initial message; and when a timer expires without resolution, tagging the initial message as unrequited.

Additionally, the method includes triggering a resolution process for prioritized response to a message containing a question when appropriate to a sender—recipient relationship by at least one of the following processes: determining a mood or anxiety from text strings in a request message; determining impending deadlines within the mean period of time between respondent access to messages; determining a trend toward more frequent responses of recipient to sender requests; and initiating a new message event referencing the initial request message.

As a consequence of determining a message containing a question, the invention enables initiating a new message event referencing the initial request message such as the following processes: transmitting a text message; synthesizing a forwarded repeat to a message inbox; dialing a phone with a recorded voice memo; transmitting an order for an in person messenger or a physical delivery; and, initiating a message editing session prepopulated with text relating to the request.

Another method for determining when a message contains a question is done by comparing question text in a frequently asked question knowledgebase with strings within the body of a received message.

As is known, executable instructions stored on non-transitory media cause a processor in a computing device to perform the equivalent function as a logic circuit.

Generally a computing device can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A computing device may execute, operate or otherwise provide an application, which can be any type and/or form of software, program, or executable instructions, including, without limitation, any type and/or form of web browser, web-based client, client-server application, an ActiveX control, or a Java applet, or any other type and/or form of executable instructions capable of executing on a computing device.

In one embodiment, a computing device provides functionality of a web server. In some embodiments, a web server comprises an open-source web server, such as the APACHE servers maintained by the Apache Software Foundation of Delaware. In other embodiments, the web server executes proprietary software, such as the Internet Information Services products provided by Microsoft Corporation of Redmond, Wash., the Oracle iPlanet web server products provided by Oracle Corporation of Redwood Shores, Calif., or the BEA WEBLOGIC products provided by BEA Systems, of Santa Clara, Calif.

Figure 6:
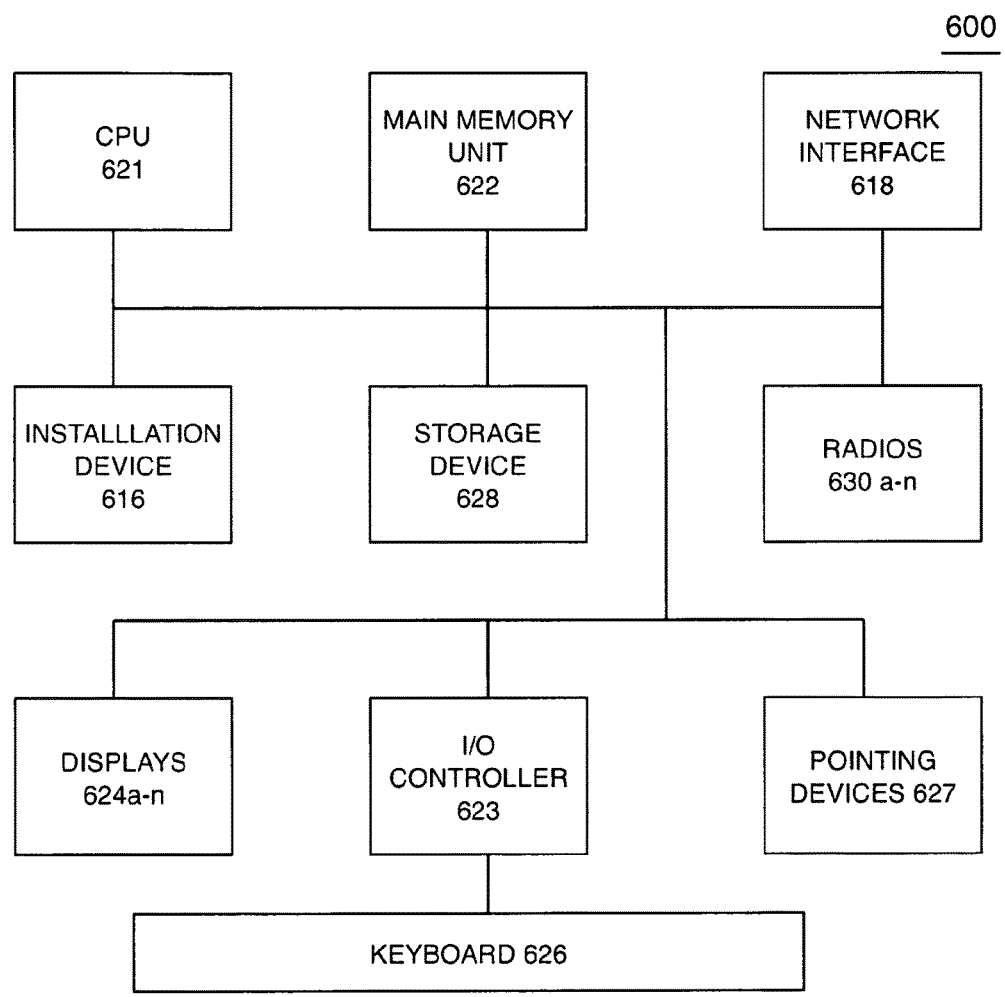
FIG. 6 depicts a computing device suitable for equivalent functionality by performing the method.

FIG. 6 depicts block diagrams of a computing device 600 useful for practicing an embodiment of the invention. As shown in FIG. 6, each computing device 600 includes a central processing unit 621, and a main memory unit 622. A computing device 600 may include a storage device 628, an installation device 616, a network interface 618, an I/O controller 623, display devices 624a-n, a keyboard 626, a pointing device 627, such as a mouse or touchscreen, and one or more other I/O devices 630a-n such as baseband processors, Bluetooth, GPS, and Wi-Fi radios. The storage device 628 may include, without limitation, an operating system and software.

The central processing unit 621 is any logic circuitry that responds to and processes instructions fetched from the main memory unit 622. In many embodiments, the central processing unit 621 is provided by a microprocessor unit, such as: those manufactured under license from ARM; those manufactured under license from Qualcomm; those manufactured by Intel Corporation of Santa Clara, Calif.; those manufactured by International Business Machines of Armonk, N.Y.; or those manufactured by Advanced Micro Devices of Sunnyvale, Calif. The computing device 600 may be based on any of these processors, or any other processor capable of operating as described herein.

Main memory unit 622 may be one or more memory chips capable of storing data and allowing any storage location to be directly accessed by the microprocessor 621. The main memory 622 may be based on any available memory chips capable of operating as described herein.

Furthermore, the computing device 600 may include a network interface 618 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 600 communicates with other computing devices 600 via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem or any other device suitable for interfacing the computing device 600 to any type of network capable of communication and performing the operations described herein.

A computing device 600 of the sort depicted in FIG. 6 typically operates under the control of operating systems, which control scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 10 and WINDOWS VISTA, manufactured by Microsoft Corporation of Redmond, Wash.; MAC OS and iOS, manufactured by Apple Inc., of Cupertino, Calif.; or any type and/or form of a Unix operating system.

In some embodiments, the computing device 600 may have different processors, operating systems, and input devices consistent with the device. In other embodiments the computing device 600 is a mobile device, such as a JAVA-enabled cellular telephone or personal digital assistant (PDA). The computing device 600 may be a mobile device such as those manufactured, by way of example and without limitation, Kyocera of Kyoto, Japan; Samsung Electronics Co., Ltd., of Seoul, Korea; Nokia of Finland; Hewlett-Packard Development Company, L.P. and/or; Sony Ericsson Mobile Communications AB of Lund, Sweden; or Research In Motion Limited, of Waterloo, Ontario, Canada. In yet other embodiments, the computing device 600 is a smart phone, Pocket PC Phone, or other portable mobile device supporting Microsoft Windows Mobile Software.

In some embodiments, the computing device 600 comprises a combination of devices, such as a mobile phone combined with a digital audio player or portable media player. In another of these embodiments, the computing device 600 is device in the iPhone smartphone line of devices, manufactured by Apple Inc., of Cupertino, Calif. In still another of these embodiments, the computing device 600 is a device executing the Android open source mobile phone platform distributed by the Open Handset Alliance; for example, the device 600 may be a device such as those provided by Samsung Electronics of Seoul, Korea, or HTC Headquarters of Taiwan, R.O.C. In other embodiments, the computing device 600 is a tablet device such as, for example and without limitation, the iPad line of devices, manufactured by Apple Inc.; the Galaxy line of devices, manufactured by Samsung; and the Kindle manufactured by Amazon, Inc. of Seattle, Wash.

The systems and methods described above may be implemented as a method, apparatus or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be PHP, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip, electronic devices, a computer-readable non-volatile storage unit, non-volatile memory, such as semiconductor memory devices, including EPROM, EEPROM, and flash memory devices; magnetic disks such as internal hard disks and removable disks; magneto-optical disks; and nanostructured optical data stores. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

CONCLUSION

The present invention can be easily distinguished by its determination of the importance of responding to a question in a message by its particular recipient given the content and the sender. The present invention can be easily distinguished by determining a trigger to alert the recipient of a potentially overlooked but urgent message. The present invention can be easily distinguished by enabling a sender to notice when a message has been uncharacteristically unrequited.

Beneficially, an apparatus transforms messages found in an inbox and messages found in an outbox into lists of requited and unrequited messages. The circuits of the apparatus further transform an unrequited message upon a condition of approaching a threshold of time into an alert which is transmitted to a message recipient or sender.

This method ensures that important requests are timely resolved is performed by an apparatus coupled to messaging servers. Conventionally, action or information requests might become overlooked or forgotten due to urgency or volume of email or other messages. But, by checking the contents of inboxes and outboxes, message requests and message replies are matched up. An alert, notification, calendar, or proposed message is automatically generated for unrequited messages.

With this invention, messages exchanged between senders and recipients are analyzed to determine a present and trending relationship. Given a history of messages between two parties, the apparatus may determine which sender-recipient pairs currently maintain close contact. An uncharacteristically delayed reply can suggest an inadvertent omission which should be remediated.

Using the disclosed invention, replies are scored to determine the degree that a request may be considered closed or simply acknowledged. If a timeframe is committed for an action or decision, that schedule is tracked for further resolution or reiteration.

The system is easily distinguished from conventional email or electronic messaging systems firstly by its detection of questions posed by messages from a sender and secondly by its matching of questions to answers from the recipient, and thirdly by its sender-recipient estimate circuit which sets a timer to an Expected Time To Reply (ETTR) which is used to organize unrequited messages for display, triggers alerts, or expire stale messages. A number of embodiments of the invention have been described. Nevertheless, it will be understood that various modifications may be made without departing from the spirit and scope of the invention. For example, other network topologies may be used. Accordingly, other embodiments are within the scope of the following claims.

We claim:

1. An online method operating in an electronic mail environment that re-prioritizes electronic messages according to identifiable requests and automates responses to the electronic messages, the online method comprising:
   collecting, at an electronic message server, one or more electronic messages directed to a user of the email environment;
   implementing a parsing circuit to detect one or more actionable message content within a content of the electronic message, wherein the one or more actionable message content includes one or more of a query and a directive from a sender of the electronic message to a recipient;
   in response to detecting the one or more actionable message content:
      (i) implementing an electronic message analyzer circuit that analyzes the content of the electronic message and a historical message database, wherein the electronic message analyzer circuit calculates (a) an urgency score and (b) an importance score for the electronic message based on a result of the analysis of the content of the electronic message and an estimated sender-recipient relationship score derived from historical electronic messages exchanged between the sender and the recipient of the electronic message;
      (ii) automatically generating, by a timer circuit, a timer value based on an input of the urgency score and the importance score;
      (iii) automatically setting, by the timer circuit, a timer for automatically generating a disposition for the electronic message, wherein the timer comprises the timer value;
   upon an expiry of the timer, automatically disposing the electronic message according to one or more predetermined dispositions if a reply to the electronic message is not generated by the recipient of the electronic message.

2. The online method of claim 1 further comprising tracking messages exchanged between sender-recipient directed dyad.

3. The online method of claim 2 wherein tracking messages comprises:
   reading a history of messages received and message transmitted;
   eliminating informational, exhortative, and rhetorical messages from consideration;
   comparing timestamps of a message received which contains a question and a reply containing a substantive answer to the question; and,
   tagging a message as unrequited on the condition that no substantive reply has been transmitted within typical time to transmission of reply (TTTR) of message receipt.

4. The online method of claim 2 further comprising ranking unrequited messages for further prosecution.

5. The online method of claim 4 wherein ranking unrequited messages comprises:
   ordering messages which contain a deadline from closest to farthest;
   ordering messages from senders according to highest probability of reply to lowest probability of reply;
   ordering messages according to shortest TTTR; and,
   ordering messages according to most number of anxiety or urgency sentiment words embedded.

6. The online method of claim 2 further comprising alerting when a message is uncharacteristically unrequited.

7. The online method of claim 6 further comprising alerting upon receipt of a message having priority content or sender identity.

8. The online method of claim 7 wherein alerting comprises at least one of the group: push notification, badge counts, putting something to the top of your inbox, a phone call, third-party communication channel, an in-person notification, and activating a tactile actuator.

9. The online method of claim 7 wherein alerting comprises at least one of:
   transmitting a text message;
   synthesizing a forwarded repeat to a message inbox;
   dialing a phone with a recorded voice memo;
   transmitting an order for an in person messenger or a physical delivery; and,
   initiating a message editing session prepopulated with text relating to the request.

10. The online method according to claim 1,
wherein analyzing the content of the message includes parsing message content and metadata for content relating to urgency and potential category of response;
transmitting an immediate alert to message recipient when importance score of message sender exceeds a sender importance threshold;
transmitting an immediate alert to message recipient when content urgency exceeds a subject urgency threshold; and
setting an unrequited tag on said received message.

11. The online method of claim 10 wherein detecting a condition that a received message contains at least one of a group, a question, a direction, and an action request comprises:
operating a neural network engine on messages sent and received;
operating an artificial intelligence engine on message pairs of requests and replies;
parsing headers and content for interrogatory words and phrases;
parsing headers and content for deadline words and phrases;
parsing headers and content for imperative and supplicative words and phrases; and
parsing headers and content for questions similar to frequently asked questions in a stored knowledgebase.

12. The online method of claim 10 wherein determining a importance score of message sender to the recipient comprises:
measuring longevity and recency;
measuring quantity and frequency; and
measuring quality and symmetry,
to determine relative importance of sender to recipient.

13. The online method of claim 10 wherein parsing message content and metadata for urgency of response comprises at least one of:
scanning content for sentiment words and phrases;
scanning content for deadline words and phrases; and
scanning content for imperative words and phrases.

14. The online method of claim 10 wherein parsing message content and metadata for potential category of response comprises at least one of:
scanning content for decision affirmation or negation words and phrases;
scanning content for calendar words and phrases; and
scanning content for units of measure and counting words.

15. The online method of claim 1 further comprising:
initializing an alert timer to a value;
while said alert timer is advancing, checking transmitted messages for substantially responding to received message;
upon detecting a transmitted message which substantially responds to received message, unsetting said unrequited tag and cancelling said alert timer.

16. The online method of claim 15 further comprising:
displaying a list of unrequited messages and values of advancing alert timers;
monitoring user input to modify or cancel advancing alert timers; and
adjusting alert timer values according to user input.

17. The online method of claim 16 further comprising:
monitoring the values of advancing alert timers;
transmitting escalating alert notifications upon exceeding alert timer thresholds; and
canceling an alert timer upon exceeding a timer horizon threshold.

18. The online method of claim 17 wherein transmitting escalating alert notifications upon exceeding alert timer thresholds comprises at least one of:
transmitting an alert of a first warning period before a deadline found in the message;
transmitting an alert at a second warning period prior to exceeding the estimated time to reply to this sender; and
transmitting an alert after exceeding an estimated time to reply by a standard deviation.

19. The online method of claim 15 wherein initializing an alert timer to a value comprises:
setting a value equal to a deadline found in the message;
setting a value equal to an estimated time to transmitted reply; and
setting a value corresponding to typical time between messages exchanged between sender and recipient.

* * * * *